Figure 1:
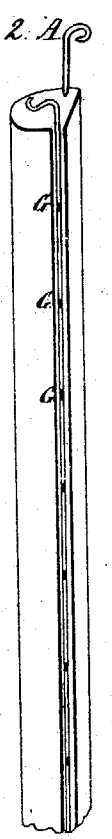
Figure 1:
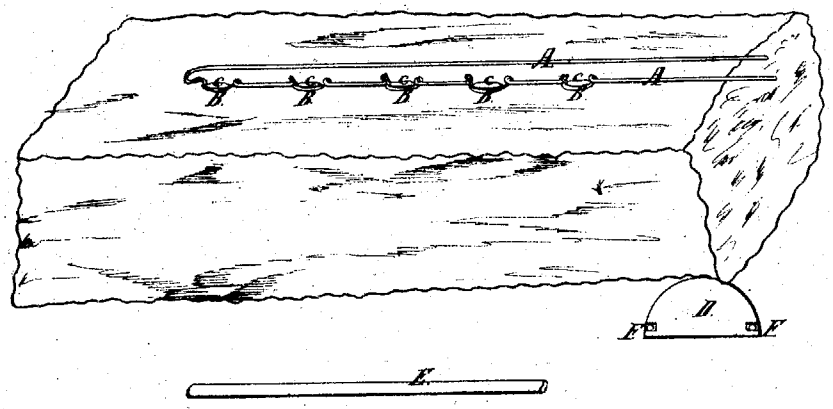

No Printed Specification Available

6014X

M. Shaw.

Electric Blasting Fuse.

Patented Jun. 3, 1830.

Fig: 2. A

Witnesses.

P.G. Warren

S F Warren

Inventor.

Moses Shaw

Moses Shaw formerly of the County of Annapolis & Province of Nova Scotia, Now of the City County & State of N.Y.

Letters Patent.

The schedule referred to in these Letters Patent and making part of the same containing a description in the words of the said Moses Shaw, himself of his improvement in the mode of blasting Rocks, Minerals, & Earths To all to whom these presents shall come, Be it known, that I Moses Shaw, formerly of Annapolis & Province of Nova Scotia, now of the City, County & State of New York, a qualified Alien, have invented or discovered a new and useful improvement in the art of blasting rocks, minerals & Earths, & the following is a full and exact description of the method of blasting as improved by me. This invention or discovery consists in the application of the electric fluid to the ignition of the powder in the rock, mineral, or earth instead of the ordinary priming & train.

Its superiority & usefulness consists in enabling operators to burst off larger masses of rocks &c, by igniting a number of charges of powder at the same instant. the masses or blocks may be also be made of more regular proportions than by the common method, & thus save much expense, in the hewing of the stone & transportation. Much gun powder may likewise be saved. These are its smaller advantages. Its great usefulness consists in being adapted to the clearing away of obstructions presented by mountains in the route of canals & rail roads & for this purpose may be of incalculable [illegible] to a liberal Country.

Mode of operating

Let the holes be bored or drilled in a regular line & of sufficient depth, then with an ordinary electrical machine & battery prepare [illegible] the end of the positive conductor be bent thus ⊥ and inserted in a small piece of baked wood thus ⊡, which is to be placed [illegible]

X6014 fully prepared near the bottom of the first hole in the range of holes to be charged, Then to conduct the spark which according to the laws of electricity will be here elicited unto the next charge or part of the charge, another wire bent as above should be cut of the length it is intended to separate the charges or parts of the charge from each other, & inserted in the opposite side of the piece of baked wood above mentioned thus.  & then by bending and inserting the oppo-site end in another piece of baked wood, the spark is a second time elicited and so on, to any extent in proportion to the strength of the machine & battery. To render the spark effectual, a small quantity of fulminating silver and fine grained gun powder should be introduced between the points of the wire conductors, which should be left with about the eighth of an inch space between them for this purpose in the piece of baked wood. This composition should consist of about the eighth part fulminating Silver & the remaining seven eighths of gun powder, to introduce it conveniently a hole should be made on either side of the baked wood above mentioned opposite to those on which the conductors enter, & by means of a quill scraped thin fixed about the points of the conductors, These fixtures being completed they are situated in the hole in the rock, mineral, or clay, as above determined & the lowest covered with gun powder to a proper height. Dry sand is to be used for tamping between the charges or the parts of the charge, & when that nearest the surface is completed with powder, a wooden plug of a conical form is driven in and sand poured in to fill the hole, The tamping should be rammed with an ordinary priming wire when all are completed in this manner, conductors served with waxed twine to preserve them in good order are made to connect the conductors in the holes with each other which completes the fixtures. The positive conductor is then brought in contact with the battery & the operation is completed by a general and simultan-eous explosion Ex'd Witness { Isaac Brown / Clinton Roosevelt }

Moses Shaw.

Eng'd

732 [illegible]

Patented June 3rd 1830.